(12) United States Patent
Suzuki

(10) Patent No.: US 6,944,280 B2
(45) Date of Patent: Sep. 13, 2005

(54) GATEWAY SYSTEM HAVING A REDUNDANT STRUCTURE OF MEDIA GATEWAY CONTROLLERS

(75) Inventor: Yuuji Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 396 days.

(21) Appl. No.: 09/945,753

(22) Filed: Sep. 5, 2001

(65) Prior Publication Data

US 2002/0027983 A1 Mar. 7, 2002

(30) Foreign Application Priority Data

Sep. 6, 2000 (JP) ........................ 2000-269459

(51) Int. Cl.7 ............................... H04M 7/00
(52) U.S. Cl. .................. 379/229; 379/230; 379/219
(58) Field of Search ................... 379/210, 211, 379/215, 114, 118, 83.12, 88.17, 88.14, 88.2, 88.26, 229, 230, 219, 220.01, 221.01, 221.08

(56) References Cited

U.S. PATENT DOCUMENTS

| | | | |
|---|---|---|---|
| 6,693,897 B1 * | 2/2004 | Huang | 370/352 |
| 2001/0036173 A1 * | 11/2001 | Shmulevich et al. | 370/352 |
| 2001/0049730 A1 * | 12/2001 | Brendes et al. | 709/223 |
| 2001/0055380 A1 * | 12/2001 | Benedyk et al. | 379/219 |

FOREIGN PATENT DOCUMENTS

| | | |
|---|---|---|
| GB | 2354904 A | 4/2001 |
| GB | 2 469 000 A | 5/2002 |
| JP | 62-210563 | 9/1987 |
| WO | WO 00/065785 A1 | 11/2000 |
| WO | WO 01/49045 A2 | 7/2001 |

OTHER PUBLICATIONS

Masaaki Yoneda, "How Do Telephones Get Connected? How Does This Relate to IP Telephone Services"?, Aug. 7, 2000, No. 323, pp. 100–105.

Yukiteru Nagatake et al., "Investigation Into High–Level IN and IP Network Connection Methods–Rules for Controller Services With Voice Over IP," Jun. 22, 2000, vol. 100, No. 153, pp. 1–6.

M. Arango et al., "Media Gateway Control Protocol (MGCP) Version 1.0", Oct. 1999.

* cited by examiner

Primary Examiner—William J. Deane, Jr.
(74) Attorney, Agent, or Firm—Foley & Lardner LLP

(57) ABSTRACT

In a gateway system for connecting a telephone network utilizing a common channel signaling system No. 7 to an IP (Internet Protocol) network, the gateway system includes a media gateway and a media gateway controller group including a plurality of media gateway controllers which are assigned a common point code. Any one of the media gateway controllers is for terminating a No. 7 signal representative of a control signal of the common channel signaling system No. 7 in the telephone network and for carrying out call control and connection control to the IP network by controlling the media gateway through the IP network so that a communication path is established between the telephone network and the media gateway. Each of the media gateway controllers comprises a No. 7 signal processing portion for terminating the No. 7 signal and a call processing control portion for carrying out the call control and the connection control to the IP network by controlling the media gateway through the IP network so that the communication path is established between the telephone network and the media gateway. The No. 7 signal processing portion and the call processing control portion have a M3UA (SS7 (Signaling System No. 7) MTP3-User Adaptation Layer) function.

8 Claims, 4 Drawing Sheets

GATEWAY SYSTEM HAVING A REDUNDANT STRUCTURE OF MEDIA GATEWAY CONTROLLERS

BACKGROUND OF THE INVENTION

This invention relates to a gateway system for connecting an existing telephone network utilizing a common channel signaling system to an IP (Internet Protocol) network.

In channel (or circuit) control for an existing telephone network utilizing a common channel signaling system, high reliability against occurrence of failure is required. In order to satisfy such a requirement, use is made of a technique in which signal transfer points or signal paths are switched so that signal processing is not interrupted even upon an occurrence of a failure. It is noted here that the common channel signaling system is a system in which a signal channel is provided in addition to a plurality of communication channels so that control signals for the communication channels are transmitted and received by the signal channel as a single data channel exclusively for the control signals. For example, a common channel signaling system No. 7 (SS7) is used in a carrier network.

On the other hand, development has been made of a gateway system for connecting the existing telephone network and an IP (Internet Protocol) network. The gateway system generally includes a plurality of media gateways. By the use of such a gateway system, various services on the IP network become available through the existing telephone network.

The above-mentioned gateway system further includes a media gateway controller (MGC) which terminates a No. 7 signal as a control signal of the common channel signaling system No. 7. The media gateway controller (MGC) controls a corresponding media gateway through the IP network to make the corresponding media gateway establish a communication path between the existing telephone network and the corresponding media gateway.

The above-mentioned media gateway controller (MGC) controls a plurality of media gateways. The media gateway controller serves as a node for carrying out call control and connection control and is therefore required to have a high reliability. On the other hand, upon occurrence of a failure, it is not possible to straightforwardly use a technique of switching the media gateway controller as a faulty node to another node as a new node.

This is because a particular communication channel between an exchange and the media gateway is identified by a destination point code (DPC) and a circuit (or channel) identification code (CIC). Therefore, the new node having a different point code (PC) can not identify the particular communication channel. Thus, the new node does not have a call status of the particular communication channel.

Upon occurrence of a failure in the media gateway controller itself or in a No. 7 network link or the IP network connected to the media gateway controller, call control for all channels controlled by the media gateway controller will be lost.

SUMMARY OF THE INVENTION

It is therefore an object of this invention to provide a gateway system capable of assuring a high reliability without causing system down time even upon an occurrence of a failure.

Other objects will become clear as the description proceeds.

According to this invention, there is provided a gateway system for connecting a telephone network utilizing a common channel signaling system No. 7 to an IP (Internet Protocol) network. The gateway system includes a media gateway and a media gateway controller group comprising a plurality of media gateway controllers which are assigned with a common point code. Any one of the media gateway controllers is capable of terminating a No. 7 signal representative of a control signal of the common channel signaling system No. 7 in the telephone network. Each of the media gateway controllers is capable of carrying out call control and connection control to the IP network by controlling the media gateway through the IP network so that a communication path is established between the telephone network and the media gateway.

DESCRIPTION OF THE PREFERRED EMBODIMENT

Figure 1:
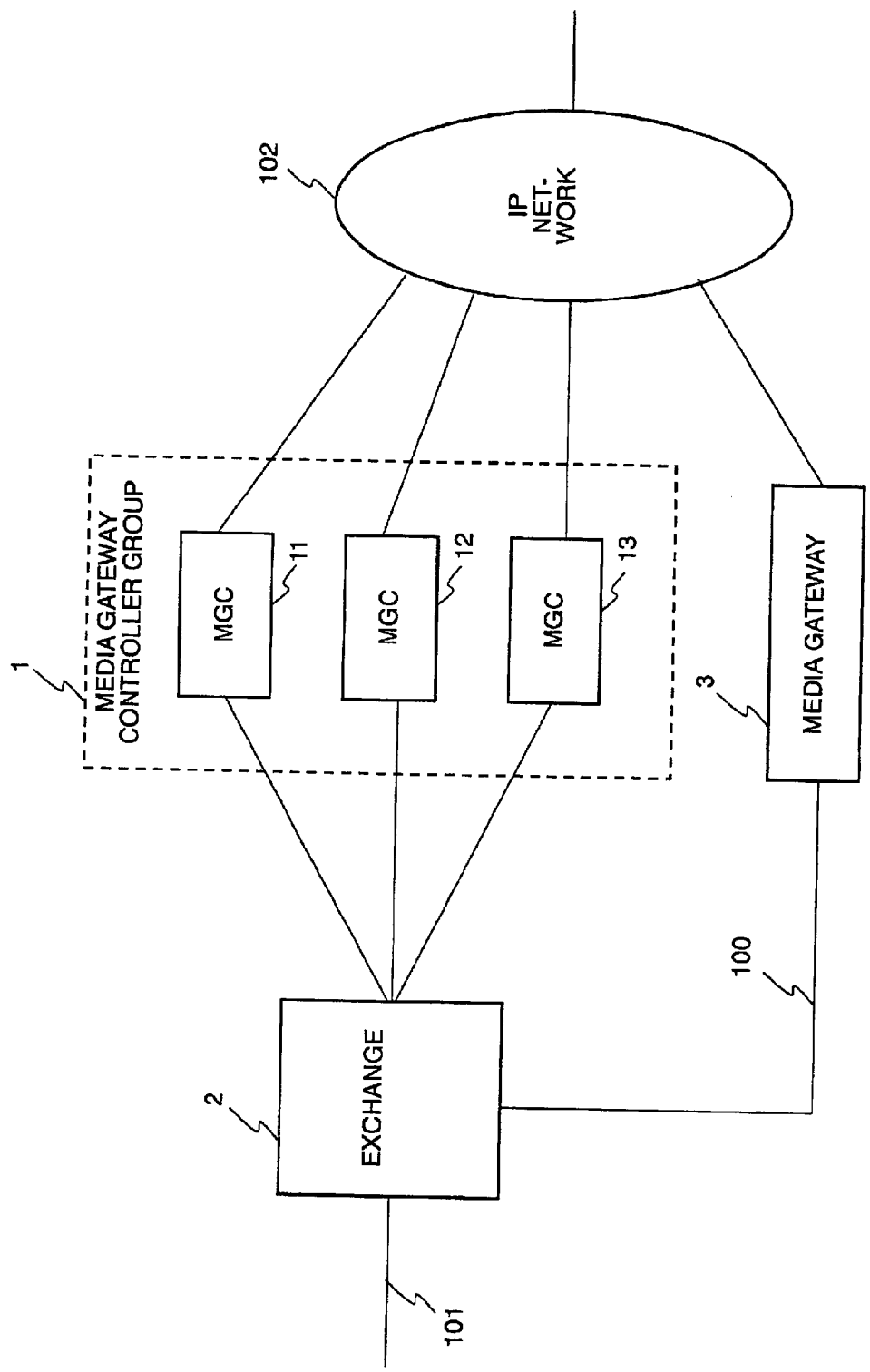
FIG. 1 is a block diagram of a gateway system according to one embodiment of this invention.

Before detailed description will be made of one embodiment of this invention with reference to the drawing, a gateway system of this invention will briefly be described for a better understanding of this invention.

A gateway system of this invention enables various services on an IP network to be provided through an existing telephone network. For example, a dial-up service using a remote access server (RAS) is known as one of such services. By realizing a redundant node structure of media gateway controllers (MGC) which serve as nodes for terminating a No. 7 signal as a control signal of a common channel signaling system No. 7 in the telephone network and for carrying out call control and connection control on the side of the IP network, the gateway system is capable of assuring high reliability without causing system down time even upon an occurrence of a failure in the media gateway controller or a signal link connected thereto.

In order to assure high reliability, the existing telephone network adopts a structure such that, in case of an occurrence of a failure in a signal transfer point (STP) as a faulty point or in a signal link as a faulty link, a signal path is switched to transfer the signal through another signal transfer point or through another signal link. Thus, the system is continuously operable without causing system down time.

Recently, development is made of the gateway system as a new system for providing various services on the IP network through the existing telephone network by the use of the media gateway (MG).

In the above-mentioned gateway system, it is essential to include the media gateway controller having a function as a signaling gateway for terminating the No. 7 signal and another function as a call agent for carrying out call control and connection control on the side of the IP network. Basically, the media gateway controller carries out call control so that the switching system applied to the signal transfer point can not be used. Therefore, upon an occurrence of a failure in the media gateway controller, the gateway system will suffer system down time.

This invention relates to the media gateway controller used in the above-mentioned services. Specifically, a plurality of media gateway controllers are grouped so as to provide a redundant structure. Such a redundant structure assures the reliability to enable the operation to be continued without causing system down even upon an occurrence of a failure.

More specifically, in the gateway system of this invention, a plurality of media gateway controllers are grouped into a media gateway controller group having a redundant structure. The media gateway controllers belonging to each single group are assigned a common point code (PC).

Each of the media gateway controllers comprises two major functional components, i.e., a No. 7 signal processing portion and a call processing control portion. Each functional component has a function of M3UA [SS7 (Signaling System No.7) MTP3-User Adaptation Layer]. By the use of SCTP (Stream Control Transmission Protocol) through the IP network, signal information is transmitted and received between the media gateway controllers.

For example, an ISUP [ISDN (Integrated Services Digital Network) User Part] signal transmitted from a No. 7 network link to one of the media gateway controllers is processed by the No. 7 signal processing portion to obtain signal information. The No. 7 signal processing portion transmits the signal information to the call processing control portion. Simultaneously, the signal information is transmitted through the IP network to the other media gateway controllers. Thus, a call status is shared by the media gateway controllers.

It is assumed that a communication channel is established between an exchange and a media gateway through a particular media gateway controller. Upon occurrence of a failure in the particular media gateway controller, the exchange or the media gateway transmits the ISUP signal or a message, which is to be transmitted to the particular media gateway controller, to another media gateway controller in the media gateway controller group. Thus, the processing for the communication channel is continued without being affected by the failure.

When the exchange transmits the ISUP signal to the media gateway controller group, an appropriate signal link is selected for the purpose of distribution in signal traffic. Thus, the load is distributed among the media gateway controllers to prevent each single media gateway controller from being assigned a heavy concentration of signal processing.

As described above, the media gateway controllers are grouped into a media gateway controller group having a redundant structure. The media gateway controllers in the media gateway controller group are assigned with the same PC and treated as a single media gateway controller. By the use of M3UA, the call status is shared among these media gateway controllers in the media gateway controller group. With this structure, the processing can continuously be carried out without causing system down time even upon an occurrence of a failure. Thus, high reliability can be assured.

Now, description will be made of one embodiment of this invention with reference to the drawing in detail.

Referring to FIG. 1, a gateway system according to one embodiment of this invention comprises a media gateway controller group (hereinafter abbreviated to an MGC group) 1, an exchange 2, and a media gateway 3. The gateway system serves to connect an existing telephone network 101 and an IP (Internet Protocol) network 102.

The MGC group 1 comprises a plurality of media gateway controllers (hereinafter abbreviated to an MGC) 11 through 13. All of the MGCs 11 through 13 belonging to the MGC group 1 have a common point code (PC). The media gateway 3 preliminarily acquires and stores IP addresses assigned to the MGCs 11 through 13 belonging to the MGC group 1 which controls the media gateway 3.

The exchange 2 is an exchange in a telephone exchange station and is connected to the existing telephone network 101 (subscriber lines). The MGCs 11 through 13 belonging to the MGC group 1 are connected to the exchange 2 through signal links belonging to a single common signal link group. In a case where a particular signal link becomes unavailable, the particular signal link is switched to another signal link. In FIG. 1, the media gateway 3 is connected to the exchange 2 through a communication path 100.

It is assumed that a user desires to use an IP network service through the existing telephone network 101. In this event, one of the MGCs 11 through 13 establishes the communication path 100 between the media gateway 3 and the exchange 2 through the IP network 102. The communication path 100 is identified by the MGCs 11 through 13 with reference to a destination point code (DPC) and a circuit (or channel) identification code (CIC). In this case, the destination point code has a value of the destination point code assigned to the MGC group 1.

Figure 2:
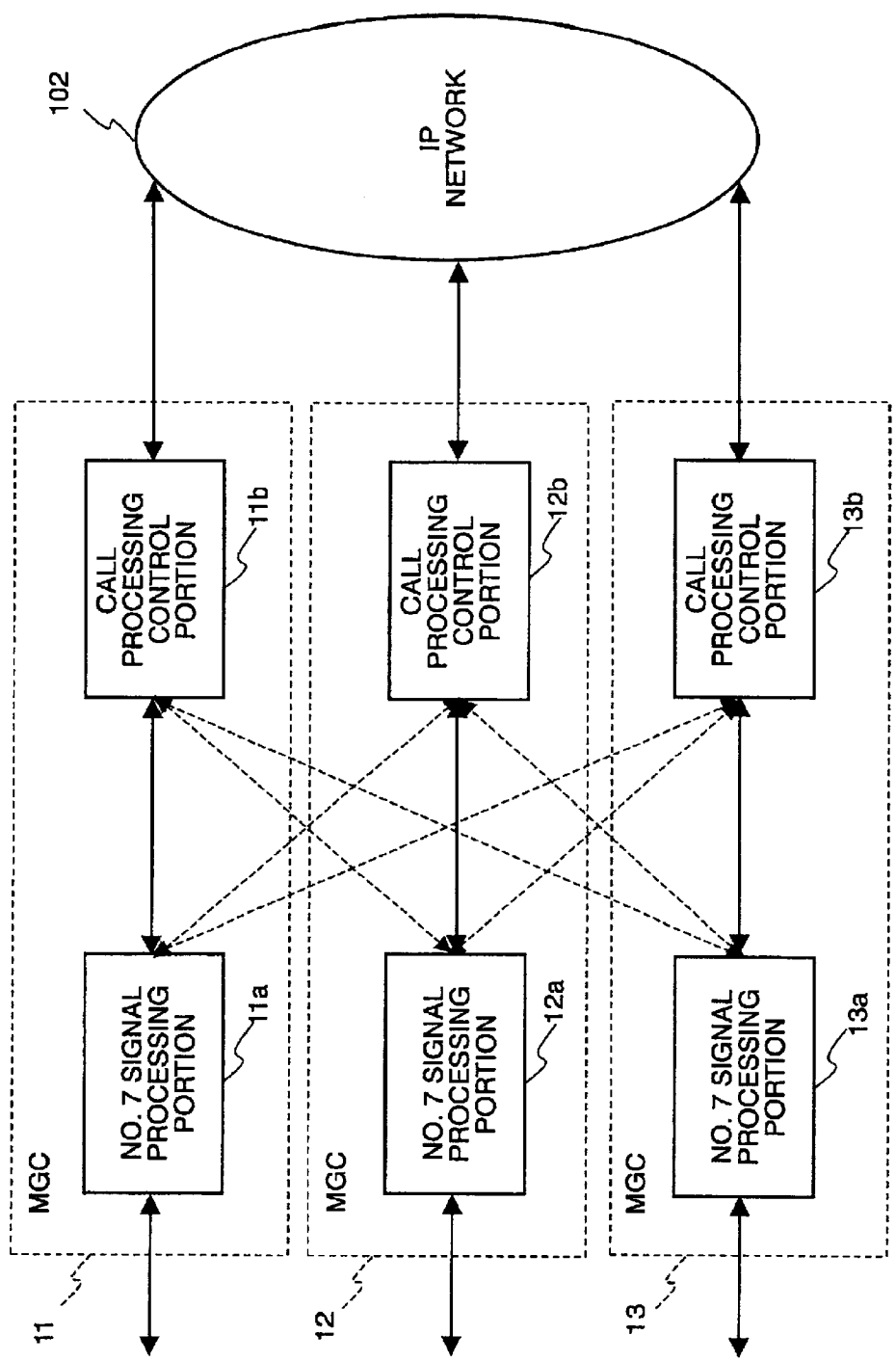
FIG. 2 is a functional block diagram of media gateway controllers belonging to a media gateway controller group illustrated in FIG. 1.

Referring to FIG. 2, the MGC 11 in the MGC group 1 comprises a No. 7 signal processing portion 11a and a call processing control portion 11b. Likewise, the MGC 12 comprises a No. 7 signal processing portion 12a and a call processing control portion 12b. The MGC 13 comprises a No. 7 signal processing portion 13a and a call processing control portion 13b.

Each of the MGCs 11 through 13 transfers signal information through the IP network 102 to other MGCs by the use of M3UA [SS7 (Signaling System No.7) MTP3-User Adaptation layer] on a SCTP (Stream Control Transmission Protocol).

Each of the No. 7 signal processing portions 11a, 12a, and 13a processes a No. 7 signal as a control signal of the common channel signaling system No. 7 (SS7) and transmits an ISUP [ISDN (Integrated Services Digital Network) User Part] message received from a No. 7 network link to each of the call processing control portions 11b, 12b, and 13b. Simultaneously, each of the No. 7 signal processing portions 11a, 12a, and 13a has an M3UA function and, by the use of the M3UA function, transmits the information to the other MGCs. Each of the No. 7 signal processing portions 11a, 12a, and 13a transmits the ISUP message from each of the call processing control portions 11b, 12b, and 13b to the No. 7 network link.

Each of the call processing control portions 11b, 12b, and 13b carries out call control and connection control, i.e., terminates the ISUP message received from each of the No. 7 signal processing portions 11a, 12a, and 13a and transmits to the IP network a message for controlling the media gateway 3 in accordance with the ISUP message. Supplied with the message from the media gateway 3, each of the call processing control portions 11b, 12b, and 13b transmits the message to each of the No. 7 signal processing portions 11a, 12a, and 13a and, simultaneously, transmits the information to the other MGCs by the use of M3UA.

As described above, the MGC group 1 has a redundant structure comprising a plurality of MGCs 11 through 13. The MGCs 11 through 13 belonging to the MGC group 1 are assigned the same point code.

Each of the MGCs 11 through 13 comprises two major functional components. Specifically, the MGC 11 comprises the No. 7 signal processing portion 11a and the call processing control portion 11b. Likewise, the MGC 12 comprises the No. 7 signal processing portion 12a and the call processing control portion 12b. The MGC 13 comprises the No. 7 signal processing portion 13a and the call processing control portion 13b. Each functional component has the M3UA function. The MGCs 11 through 13 transmit and receive signal information to and from one another through the IP network 102 by the use of the SCTP.

For example, the ISUP signal transmitted from the No. 7 network link to the MGC 11 is processed by the No. 7 signal processing portion 11a. The No. 7 signal processing portion 11a transmits the signal information to the call processing control portion 11b. Simultaneously, the signal information is also transmitted to the other MGCs 12 and 13 through the IP network 102. As a consequence, the MGCs 11 through 13 share the call status.

When the communication channel path is established between the exchange 2 and the media gateway 3 through the MGC 11, it is assumed that a failure occurs in the MGC 11. In this event, the exchange 2 or the media gateway 3 transmits the ISUP signal or the message, which is to be transmitted to the MGC 11, to the other MGC 12 or 13 in the MGC group 1. In this manner, the processing for the communication path 100 is continuously carried out without being affected by the failure.

When the exchange 2 transmits the ISUP signal to the MGC group 1, an appropriate signal link is selected for the purpose of distribution in signal traffic. Thus, the load is distributed among the MGCs 11 through 13 to prevent each single one of the MGCs 11 through 13 from being assigned a heavy concentration of signal processing.

As described above, the MGCs 11 through 13 are grouped into the MGC group 1 having a redundant structure. The MGC group 1 is treated as a single MGC. Specifically, the MGCs 11 through 13 in the MGC group 1 are assigned with the same point code. By the use of M3UA, the call status is shared. Thus, processing is continuously carried out without causing system down time even upon an occurrence of a failure. Thus, high reliability is assured.

Figure 3:
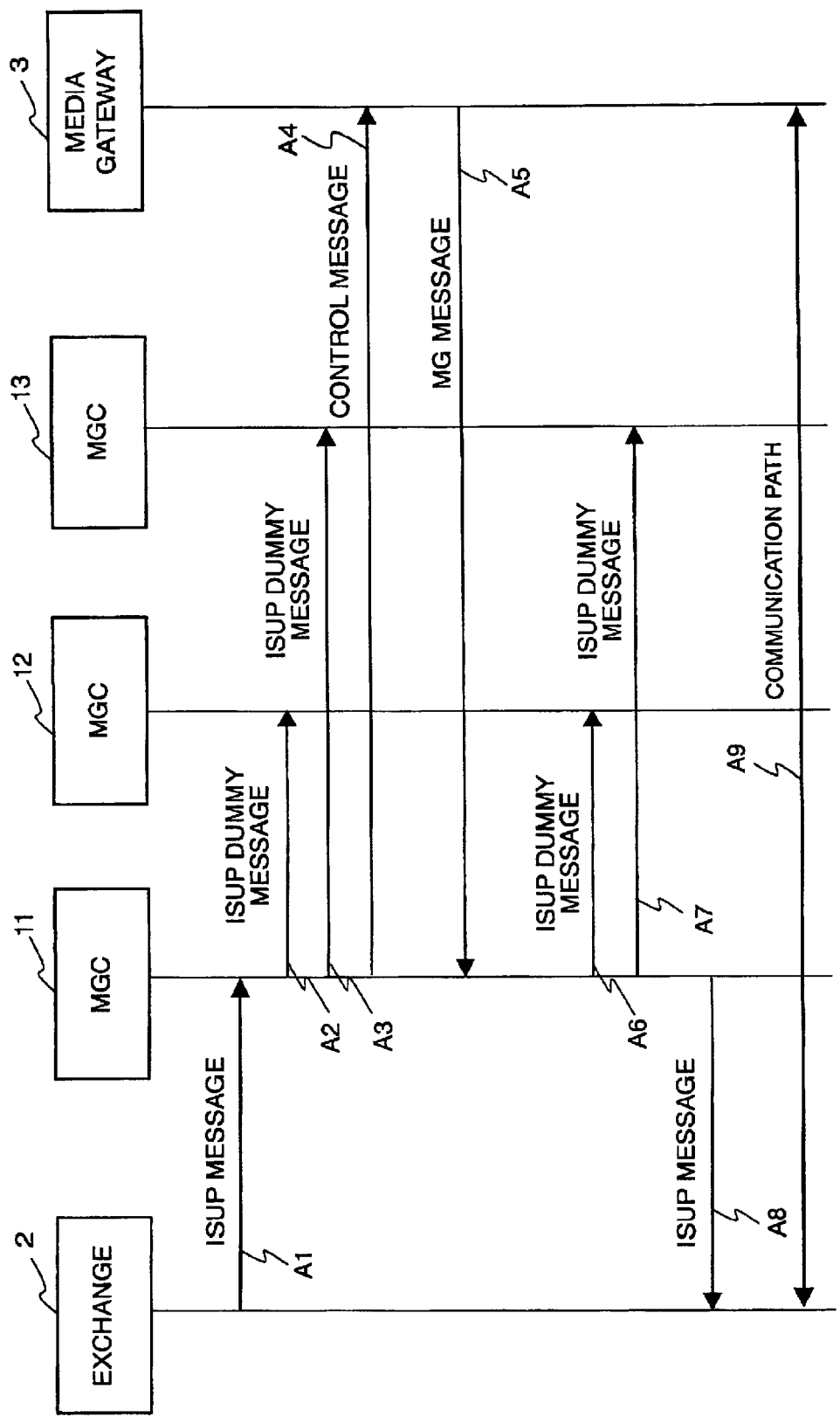
FIG. 3 is a sequence chart for describing an operation of the gateway system illustrated in FIG. 1.
Figure 4:
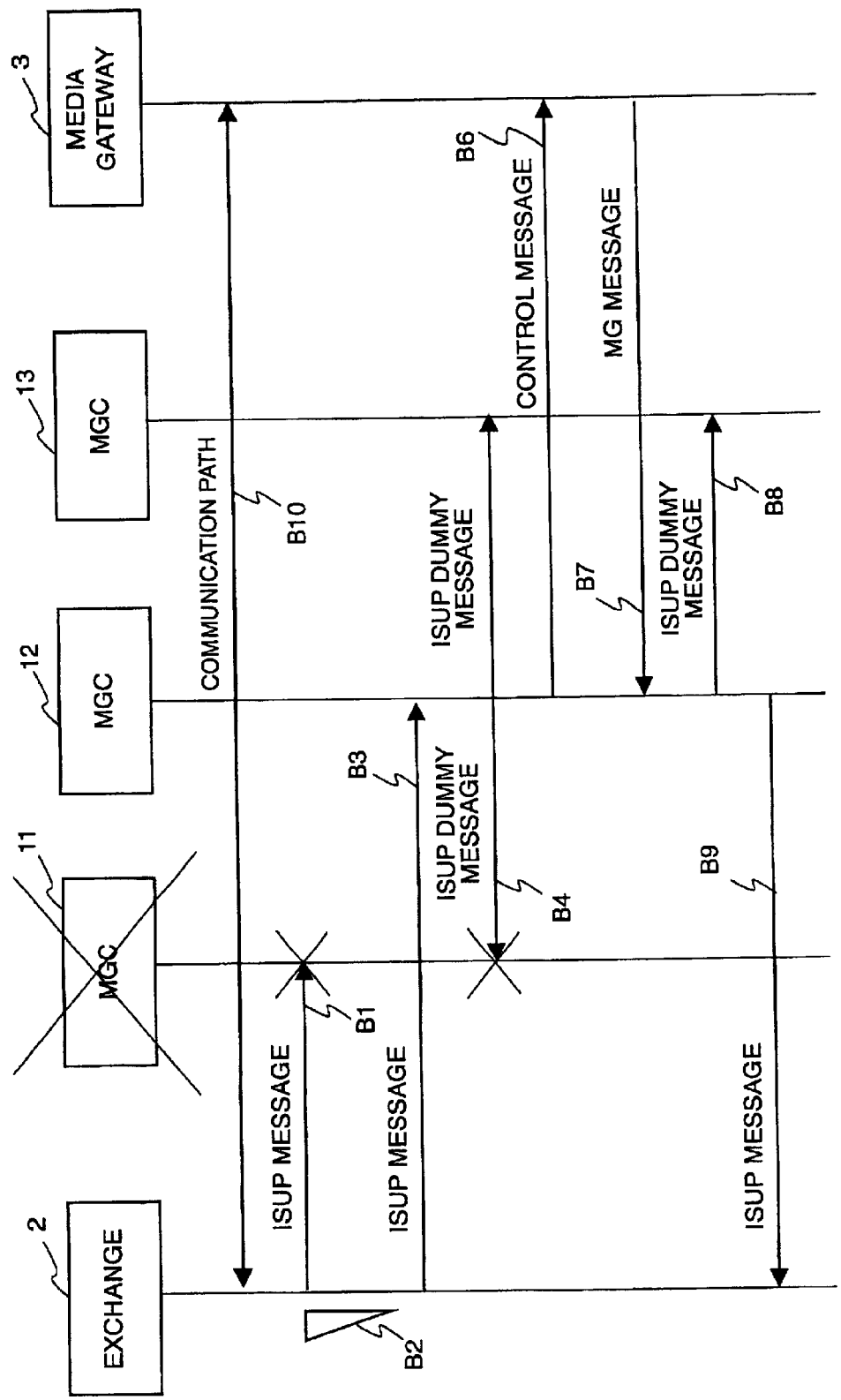
FIG. 4 is a sequence chart for describing the operation of the gateway system illustrated in FIG. 1 upon occurrence of a failure.

Referring to FIGS. 3 and 4 in addition to FIGS. 1 and 2, description will be made of the operation of the gateway system of this embodiment.

It is assumed that a call is originated from the existing telephone network 101 (subscriber lines) and received by the exchange 2 connected thereto. In this event, the exchange 2 selects one of the MGCs 11 through 13 which corresponds to a designated telephone number and transmits an ISUP message (A1 in FIG. 3) to the selected one of the MGCs 11 through 13.

For example, the exchange 2 transmits an IAM (Initializing Address Message) (A1 in FIG. 3) of the ISUP to the MGC 11. In the MGC 11 supplied with the message, the message is transmitted through the No. 7 signal processing portion 11a to the call processing portion 11b.

Simultaneously, the No. 7 signal processing portion 11a processes the IAM message as a reception IAM message into an M3UA format so that the reception IAM message is transferred to the other MGCs 12 and 13 through the IP network 102 by the use of the SCTP (A2, A3 in FIG. 3). At this time, the No. 7 signal processing portion 11a attaches a dummy flag to the IAM message to be transferred.

In the MGCs 12 and 13 supplied with the message, the call processing control portions 12b and 13b identify the dummy flag. Then, with respect to the message with the dummy flag attached thereto, the call processing control portions 12b and 13b do not transmit the message to the media gateway 3 but they do record the information of the call in question.

The call processing control portion 11b identifies the channel with reference to a channel identification information (destination point code and channel identification code) contained in the IAM message. In accordance with a routing table (not shown) in the MGC 11, the call processing control portion 11b transmits a call setup message (A4 in FIG. 3) through the IP network 102 to the media gateway 3 which establishes the communication path 100.

Similarly, when the MGC 11 receives a response message (A5 in FIG. 3) from the media gateway 3, the call processing control portion 11b of the MGC 11 transmits the ISUP-ACM message to the No. 7 signal processing portion 11a. Simultaneously, this message is processed into the M3UA format. In the manner similar to the transmission technique by the No. 7 signal processing portion 11a, the ACM message with the dummy flag attached thereto is transmitted to the other MGCs 12 and 13 (A6 and A7 in FIG. 3).

In the MGCs 12 and 13, the No. 7 signal processing function portion 12a and 13a do not transmit the message to the No. 7 network link but they do record the status as the information of the call in a case where the dummy flag is identified. The No. 7 signal processing portion 11a of the MGC 11 transmits the ISUP-ACM message to the No. 7 network link (A8 in FIG. 3). By the above-mentioned operation, the call status is shared by the MGCs 11 through 13. In this event, by the above-mentioned operation, the communication path 100 is established between the exchange 2 and the media gateway 3 (A9 in FIG. 3).

Next referring to FIG. 4, description will be made of the operation in case where a failure occurs in the MGC 11 and communication with the MGC 11 becomes impossible.

It is assumed that the communication path 100 (B10 in FIG. 4) is established through the MGC 11. When the exchange 2 transmits the ISUP message (B1 in FIG. 4) to the MGC 11, the MGC 11 becomes inoperable due to a failure. In this event, a timer (B2 in FIG. 4) set in the exchange 2 detects "message time out".

The exchange 2 detects an error by the above-mentioned time out and sets the status of the MGC 11 as a faulty state. The exchange 2 inhibits the transmission of signals to the signal link in question so that the transmission of the signals is not carried out until the recovery from the faulty state. The exchange 2 transmits again the ISUP message (B3 in FIG. 4) of the same content to another signal link (in this case, the destination is the MGC 12) belonging to the same signal link group connected to the MGC group 1.

The MGC 12 receives the dummy message from the MGC 11 and shares the call status for the communication channel in question. Since the MGC 12 has the same point code as the MGC 11, the channel is correctly identified. The No. 7 signal processing portion 12a of the MGC 12 transmits the ISUP message to the call processing control portion 12b and simultaneously transmits the ISUP message to the other MGCs 11 and 13 in the MGC group 1 in the manner similar to that mentioned above (B4, B5 in FIG. 4).

The MGC 11 in the faulty state can not receive the message. The MGC 12 detects this situation and sets the status of the MGC 11 as the faulty state and does not transmit any message until the MGC 11 is recovered from the faulty state. By the above-mentioned operation, call control can be continuously carried out by the other MGCs 12 and 13 belonging to the same MGC group 1 even if a failure occurs in the MGC 11 (B6, B7, B8, B9 in FIG. 4).

That is, in B6 in FIG. 4, the MGC 12 transmits the call setup message through the IP network 102 to the media gateway 3 like in A4 in FIG. 3. In B7 in FIG. 4, the MGC 12 receives the response message from the media gateway 3 like in A5 in FIG. 3. In this event, the call processing control portion 12b of the MGC 12 transmits the ISUP-ACM message to the No. 7 signal processing portion 12a. Simultaneously, this message is processed into the M3UA format. In the manner similar to the transmission technique by the No. 7 signal processing portion 12a, the ACM message with the dummy flag attached thereto is transmitted to the MGC 13 in B8 in FIG. 4 (like in A7 in FIG. 3).

In the MGC 13, the No. 7 signal processing function portion 13a does not transmit the message to the No. 7 network link but it does record the status as the information of the call in a case where the dummy flag is identified. The No. 7 signal processing portion 12a of the MGC 12 transmits the ISUP-ACM message to the No. 7 network link B9 in FIG. 4 (like in A8 in FIG. 3).

As described above, in the system environment for providing the IP network service through the existing telephone network 101 by the use of the media gateway, the redundant structure of the MGCs 11 through 13 for processing the signaling and for carrying out the call control is realized. With this structure, even upon an occurrence of a failure in the MGCs 11 through 13 or in the signal link, the call control is assured by the use of the other MGCs without causing system down time. Thus, high reliability is assured. By flexibly combining the No. 7 signal processing portions 11a, 12a, and 13a and the call processing control portions 11b, 12b, and 13b and by distributing the processing among a plurality of the MGCs 11 through 13, it is possible to achieve load distribution without heavy concentration of processing being assigned to a single node.

In the foregoing description, the number of the MGCs is equal to three. In the above-mentioned structure, however, the number of MGCs can be increased within a range such that the IP addresses can be assigned.

In order to share the call status among the MGCs 11 through 13, use is made of the technique of transmitting the ISUP message through the IP network 102 by the use of the M3UA/SCTP. Alternatively, the MGCs may be connected by high-speed bus connection to transmit/receive/share the information. In this event, by flexibly changing a combination of the functional components including the No. 7 signal processing portions 11a, 12a, and 13a and the call processing control portions 11b, 12b, and 13b in accordance with the use ratio or the faulty state of each functional component, it is possible to distribute the load.

If the number of the MGCs is increased, each signal MGC group may be provided with a call status managing node. In this event, it is unnecessary to transmit the dummy message of ISUP to all of the MGCs 11 through 13. By selecting the functional component having a lowest use ratio upon carrying out the processing, the redundant structure can be more effectively utilized.

As described above, in the gateway system for providing the IP network service through the existing telephone network by the use of the media gateway, a plurality of the media gateway controllers for terminating the No. 7 signal as the control signal of the common channel signaling system No. 7 in the existing telephone network and for carrying out call control and connection control on the side of the IP network are grouped into the media gateway controller group having the redundant structure. Thus, even upon an occurrence of a failure, high reliability is assured without causing system down time.

What is claimed is:

1. A gateway system connecting a telephone network utilizing a common channel signaling system No. 7 to an IP (Internet Protocol) network, said gateway system comprising:

a media gateway; and a media gateway controller group comprising a plurality of media gateway controllers which are assigned a common point code, wherein each of said media gateway controllers in said media gateway controller group is capable of terminating a No. 7 signal representative of a control signal of the common channel signaling system No. 7 in said telephone network, and wherein each of said media gateway controllers in said media gateway controller group is capable of carrying out call control and connection control to said IP network by controlling said media gateway through said IP network so that a communication path is established between said telephone network and said media gateway, and wherein one of said media gateway controllers in said media gateway controller group transmits signal information with a dummy flag to all others of said media gateway controllers in said media gateway controller group, to thereby provide the signal information to be used to maintain a call by one of said others of said media gateway controllers in a case that said one of said media gateway controllers experiences a failure during the call.

2. A gateway system as claimed in claim 1, wherein said telephone network includes a dial up service using a remote access server.

3. A gateway system as claimed in claim 1, further comprising load distribution means for distributing a call load among said media gateway controllers of said media gateway controller group so as not to overload any one of said media gateway controllers.

4. A gateway system as for connecting a telephone network utilizing a common channel signaling system No. 7 to an IP (Internet Protocol) network, said gateway system comprising:

a media gateway; and a media gateway controller group comprising a plurality of media gateway controllers which are assigned a common point code, wherein each of said media gateway controllers in said media gateway controller group is capable of terminating a No. 7 signal representative of a control signal of the common channel signaling system No. 7 in said telephone network, and wherein each of said media gateway controllers in said media gateway controller group is capable of carrying out call control and connection control to said IP network by controlling said media gateway through said IP network so that a communication path is established between said telephone network and said media gateway, wherein each of said media gateway controllers comprises:

a No. 7 signal processing portion for terminating said No. 7 signal; and a call processing control portion for carrying out the call control and the connection control to said IP network by controlling said media gateway through said IP network so that the communication path is established between said telephone network and said media gateway, wherein said No. 7 signal processing portion and said call processing control portion each have a M3UA (SS7 (Signaling System No. 7) MTP (Message Transfer Part) 3-User Adaptation Layer) function, wherein said No. 7 signal processing portion of one of said media gateway controllers in said media gateway controller group receives and processes an Integrated Services Digital Network User Part (ISUP) signal transmitted from said telephone network to obtain signal information, and transmits the signal information as an ISUP message to said call processing control portion of said one of said media gateway controllers, and also transmits the signal information as a Dummy ISUP message to all others of said media gateway controllers in said media gateway controller group, to thereby provide the signal information to be used to maintain a call by one of said others of said media gateway controllers in a case that said one of said media gateway controllers experiences a failure during the call.

5. A gateway system as claimed in claim 4, wherein said media gateway controllers of said media gateway controller group transmit and receive signal information to and from one another through said IP network by the use of SCTP (Stream Control Transmission Protocol).

6. A gateway system as claimed in claim 4, wherein said media gateway controllers of said media gateway controller group share the information of a call by the use of said M3UA function.

7. A gateway system as claimed in claim 6, wherein said media gateway controllers of said media gateway controller group transmit and receive signal information to and from one another through said IP network by the use of SCTP (Stream Control Transmission Protocol).

8. A gateway system as claimed in claim 4, wherein the Dummy ISUP message is not provided to said media gateway, and only said ISUP message is provided to said media gateway, and wherein the Dummy ISUP message of said one of said others of said media gateway controllers is converted to said ISUP message and thereby sent to said media gateway, when said one of said media gateway controllers is determined to have experienced the failure.

* * * * *